(12) United States Patent
Terpstra et al.

(10) Patent No.: US 8,401,161 B2
(45) Date of Patent: Mar. 19, 2013

(54) ROUTING OUTBOUND TOLL-FREE CALLS THROUGH A VOIP NETWORK

(75) Inventors: Richard Terpstra, Superior, CO (US); Greg Gualtieri, Denver, CO (US); Dan Jordan, Littleton, CO (US); Janis Griffin, Longmont, CO (US); Murli S Nair, Kalyan (IN); Susmita G Saha, Longmont, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1531 days.

(21) Appl. No.: 11/746,537

(22) Filed: May 9, 2007

(65) Prior Publication Data

US 2008/0279354 A1    Nov. 13, 2008

(51) Int. Cl.
*H04M 15/00* (2006.01)
*H04M 7/00* (2006.01)
(52) U.S. Cl. .......... 379/114.24; 379/115.01; 379/220.01
(58) Field of Classification Search ............. 379/114.24, 379/114.28, 114.29, 115.01, 220.01, 221.02, 379/221.09, 221.14; 370/352
See application file for complete search history.

(56) References Cited

U.S. PATENT DOCUMENTS

| 6,654,451 | B1 * | 11/2003 | Ward ....................... 379/114.24 |
| 2005/0041795 | A1 * | 2/2005 | Goldstein et al. ......... 379/221.13 |
| 2006/0093112 | A1 * | 5/2006 | Book et al. ............... 379/114.24 |
| 2007/0064685 | A1 * | 3/2007 | Crockett et al. ............. 370/356 |

* cited by examiner

Primary Examiner — Quoc D Tran
(74) Attorney, Agent, or Firm — John C. Heuton

(57) ABSTRACT

A method for routing a toll-free call through a network includes receiving a toll-free call from a call origination endpoint, determining an identifier associated with the call origination endpoint, determining a meet point trunk based on at least a portion of the identifier if a DAL is not available, and routing the toll-free call to a LEC via the determined meet point trunk. A system for routing a toll-free call entering a network to an appropriate carrier includes an inbound gateway device configured to receive a toll-free call from a call origination endpoint having an assigned telephone number and to query a core routing engine (CRE) for a route plan using the assigned telephone number, and a CRE configured to select an interconnection access line based on the origination endpoint telephone number, wherein the interconnection access line is connected to a LEC that is operable to route the call to the appropriate carrier.

20 Claims, 6 Drawing Sheets

ROUTING OUTBOUND TOLL-FREE CALLS THROUGH A VOIP NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006 Level 3 Communications, Inc.

TECHNICAL FIELD

Embodiments of the present invention generally relate to outbound routing of toll-free calls through a Voice over Internet Protocol (VoIP) network. More specifically, embodiments relate to outbound routing of toll-free calls based on a number or region assigned to the calling party.

BACKGROUND

Toll-free telephone numbers (also referred to as Freephone, Freecall, or "1-800" telephone numbers), or simply toll-free numbers, are telephone numbers in which the calling party is not charged for the call by the telephone carrier. Toll-free subscribers, such as businesses, provide toll-free numbers for many purposes. For example, toll-free numbers are often provided for technical support, customer service, home shopping, telemarketing, and television viewer polling. Toll-free subscribers subscribe to toll-free service through Interexchange Carriers (IXCs), which receive calls from Local Exchange Carriers (LECs) and complete the calls to the toll-free subscriber. In a circuit-switched environment, routing a toll-free call to the proper IXC in the proper region is a relatively straight-forward matter, in part because the LEC is associated with a limited geographic location: the LEC receives toll-free calls from within that region, and uses an 800 Service Management System (800/SMS) database to identify an IXC to route the call to, within the geographic region. However, setting up toll-free calls through a packet-switched network, such as Voice over Internet Protocol (VoIP) networks, to the preferred IXC in the appropriate region can be problematic, in part because toll-free calls originating in a VoIP network do not have geographic relevance.

When a conventional circuit-switched telephone is used to the make a toll-free call, the call enters the Public Switched Telephone Network (PSTN) through a local exchange carrier (LEC) or a competitive LEC (CLEC). The LEC has tandem switches that are connected to IXCs that can handle toll-free calls. Upon receipt of a toll-free call, the LEC queries an 800/SMS database, which returns a carrier identification code (CIC) identifying the IXC that handles the toll-free number. In such conventional situations when the call originates through a LEC and/or CLEC, the region or NPA area is essentially predetermined because the calling telephone is necessarily in the region of the LEC and/or CLEC. As such, toll-free calls from the LEC are routed to a preferred IXC in the region. Preferably, toll-free subscribers can reasonably estimate the number of toll-free calls expected in each region and can plan accordingly, in terms of providing the infrastructure (e.g., connections with the LEC) that may be required to handle the calls.

However, VoIP-enabled telephones are often designed for mobility, and calls made from VoIP-enabled telephones initially enter a VoIP backbone network that is geographically distributed. As such, VoIP calls originating from a given VoIP telephone, including toll-free calls, can enter the network at multiple geographic regions. Any given VoIP backbone network is typically connected to many LECs and CLECs. When a toll-free call is received on the VoIP backbone network, because there is no geographical relevance to the call, the call may be routed to any of the LECs, without regard for the region assigned to the caller. Under arrangements with CLECs, a VoIP network provider will sometimes simply direct toll free calls to a CLEC and rely on the CLEC to route the toll free calls to an appropriate IXC in the appropriate region. However, this has resulted in failed or misrouted calls. For example, sometimes calls are blocked by the toll-free subscriber because the calls appear to have originated from a time zone or region that is different from the region assigned to the caller. Consequently, conventional approaches to routing toll free calls through a VoIP network have had undesirable results from the perspective of IXCs and/or their toll-free subscribers.

It is with respect to these and other considerations that embodiments of the present invention have been made.

SUMMARY

Embodiments are described for routing toll-free calls through a geographically distributed network that spans multiple localities. Methods and systems utilize an identifier associated with the calling endpoint (e.g., telephone number, IP address, etc.) to determine an outbound route. Outbound routes may include an interconnection access line, such as a meet point trunk connected to a local carrier network, or a direct access line connected to a long distance carrier network. Interconnection access line identifiers may be provisioned in association with calling endpoint identifiers.

An embodiment of a method can be used for routing of a toll-free call through a geographically distributed network configured to route calls from call origination endpoints, whereby a call originating from a call origination endpoint may enter the geographically distributed network at any one of a plurality of geographic regions. The method may include receiving a toll-free call from a call origination endpoint, determining an identifier associated with the call origination endpoint, wherein the identifier is statically associated with a specified geographic region, determining a meet point trunk based on at least a portion of the identifier, if a direct access line (DAL) is not available for providing access to an interexchange carrier (IXC) configured to terminate the toll-free call in the specified geographic region, and routing the toll-free call to a local exchange carrier (LEC) via the determined meet point trunk.

In some embodiments, the method includes determining whether a DAL is available. This may involve querying an SMS/800 database, receiving a carrier identification code (CIC) from the SMS/800 database or other module configured to provide carrier identification codes in response to the querying operation, and searching for an available direct access line (DAL) based on the received CIC.

In various embodiments the geographically distributed network includes a managed backbone Voice over Internet Protocol (VoIP) network. The identifier may include a telephone number in the form NPA-NXX-YYYY. In such embodiments, determining a meet point trunk may include looking up a route plan mapped to a range of NPA/NXX numbers in a route plan database. The method may further include provisioning a plurality of CIC-based route plans and a plurality of originating endpoint number (OEN)—based route plans. The method may still further include mapping each of a plurality of meet point trunks to the range of NPA/NXX numbers. Further still, the method may include mapping each of a plurality of DALs to an associated CIC.

Another embodiment includes a computer-readable medium having computer-executable instructions causing a computer to perform a process of routing toll-free calls through a geographically distributed network spanning a plurality of regions, and configured to handle toll-free calls from call origination endpoints. The process may include receiving, in the geographically distributed network, a toll-free call from a call origination endpoint, determining one or more interconnection access lines providing access to a regional access carrier, wherein the interconnection access lines are associated with the call origination endpoint's assigned number, selecting a first one of the plurality of interconnection access lines for routing the toll-free call to the regional access carrier, and routing the toll-free call to the regional access carrier via the first selected interconnection access line.

Embodiments of the process may further include determining whether a direct access line is available that provides access from the geographically distributed network to an interexchange carrier configured to handle the toll-free call. Determining whether a direct access line is available may comprise querying a carrier identification code (CIC) database configured to supply a CIC associated with a region associated with the origination endpoint's assigned number, responsively receiving a CIC from the CIC database, and searching an access line database for a direct access line associated with the received CIC. The process may further include mapping a plurality of NPA/NXX numbers to an available interconnection access line. Mapping the plurality of NPA/NXX numbers may include identifying a tandem switch connected to the interconnection access line. The CIC database can be at least one of a toll-free call administration database and an ENUM database.

An embodiment of a system for routing a toll-free call entering a network to an appropriate carrier includes an inbound gateway device configured to receive a toll-free call from a call origination endpoint having an assigned telephone number and query a core routing engine for a route plan using the assigned telephone number. The system may further include a core routing engine (CRE) configured to select an interconnection access line based on the origination endpoint telephone number, wherein the interconnection access line is connected to a local exchange carrier (LEC) that is operable to route the call to the appropriate carrier.

Embodiments of the system may further include a provisioning module configured to identify one or more meet point trunks in the network and map a range of NPA/NXX numbers to each of the one or more meet point trunks. The CRE may still further be configured to look up a Local Access and Transport Area (LATA) associated with the origination endpoint and query a toll-free administration database using the LATA to determine a carrier identification code (CIC) associated with an appropriate interexchange carrier (IXC). The system may further include a route plan database having a toll-free route partition, wherein the provisioning module is further configured to store a plurality of route plans associated with toll-free calls. At least one of the plurality of route plans may identify a meet point trunk and an off-network carrier. The system may still further include an outbound gateway device configured to route the toll-free call via the selected interconnection access line.

Figure 1:
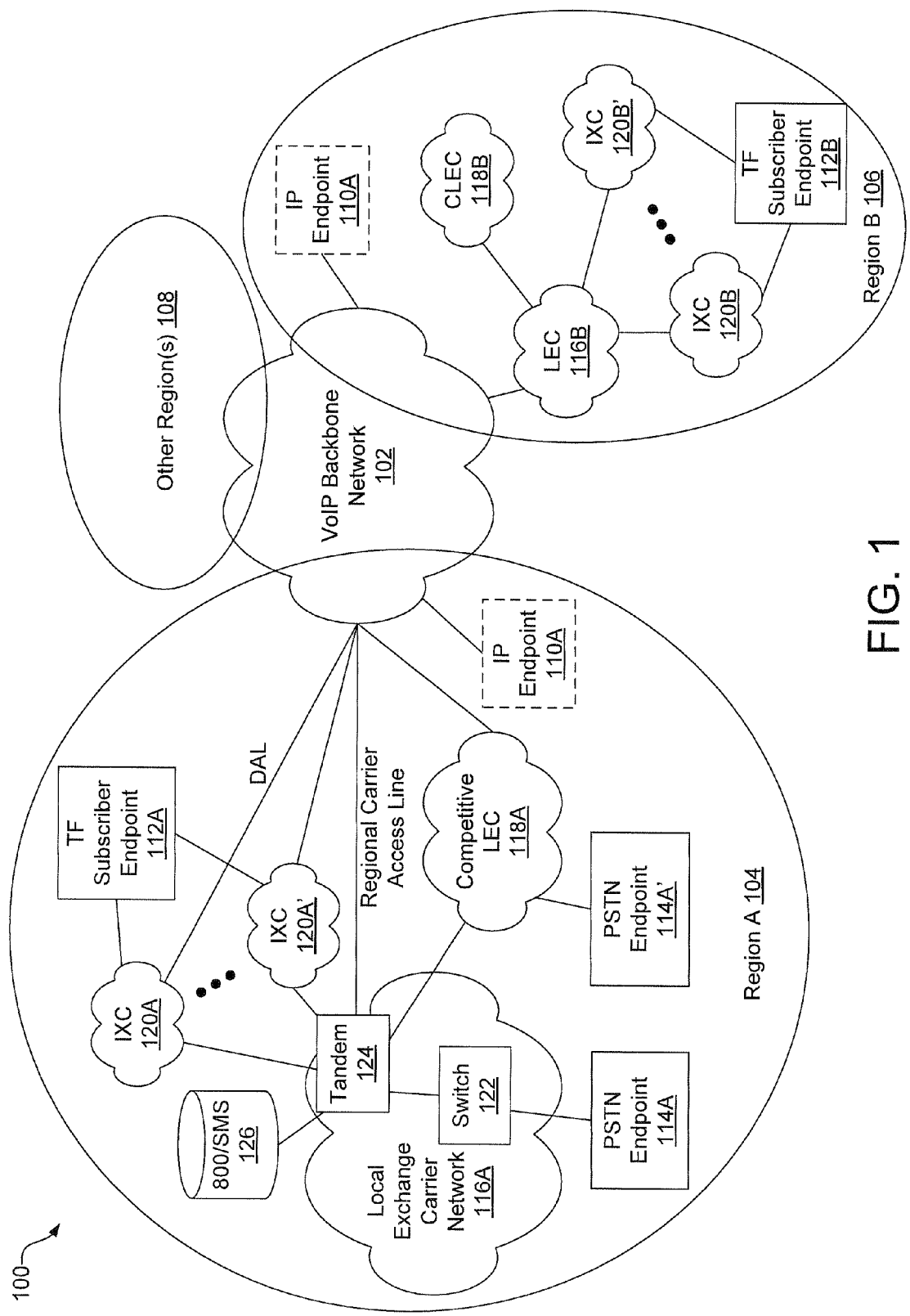
FIG. 1 illustrates an exemplary operating environment within which toll-free calls entering a geographically distributed network, such as a VoIP network, can be routed to a toll-free service provider network, or other regional network.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to systems and methods for outbound routing of toll-free calls based on the region or number assigned to the toll-free call originating endpoint. More specifically, embodiments relate to routing toll-free calls to toll-free service providers, or regional carrier networks that can route the calls to the toll-free service providers in the region assigned to the originating endpoint. The region may be determined based on the originating endpoint number (OEN) or a portion thereof, or the region may be determined by a Local Access and Transport Area (LATA) lookup. The region can be used to determine a CIC, which in turn can be used to determine a direct access line to an IXC. Alternatively, the region may be used to determine an interconnection access line (IAL) to a LEC.

Some embodiments relate to systems and methods for determining a regionally significant access line over which to route a toll-free call received in a geographically distributed network. The access line is determined based on a number or region assigned to the calling party. The access line may be a direct access line to an IXC or an IAL to a LEC. A Direct Access Line (DAL) may be selected based on the region assigned to the calling party. An interconnection access line may be selected based on at least a portion of the telephone number assigned to the calling party.

Prior to describing one or more preferred embodiments of the present invention, definitions of some terms used throughout the description are presented.

DEFINITIONS

A "module" is a self-contained functional component. A module may be implemented in hardware, software, firmware, or any combination thereof.

The terms "connected" or "coupled" and related terms are used in an operational sense and are not limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates an exemplary operating environment 100, in which toll-free calls can be routed via a geographically distributed network, such as a Voice over Internet Protocol (VoIP) network 102, based on a region and/or number associated with the calling party. However, embodiments of the invention may also be applicable to provide connectivity for an IXC, CLEC, Wireless Carrier via time division multiplexing (TDM) or IP, or a VoIP provider. The VoIP network 102 is a backbone communication network that spans local exchange region A 104, local exchange region B 106, and other local exchange regions 108. These regions may correspond to Local Access and Transport Areas (LATAs). In one embodiment, a VoIP telephone service subscriber may use an IP endpoint 110A to communicate over the VoIP network 102. The IP endpoint 110A may be a VoIP phone, a terminal adapter, a VoIP enabled computer (e.g., handheld computer), or other VoIP enabled device. As such, the IP endpoint 110A may be mobile and may move from one local exchange region to another, as is illustrated in FIG. 1 with dotted lines for the IP endpoint 110A in region A 104 and region B 106.

In this description, it is assumed that the IP endpoint 110A is assigned a telephone number (e.g., NPA/NXX number) associated with region A. The telephone number assigned to the IP endpoint 110A is the telephone number that other parties use to call the IP endpoint 110A. For ease of description, the IP endpoint 110A telephone number is referred to as a calling party number or originating endpoint number (OEN) in situations where the IP endpoint 110A is used to place a call. Of particular relevance to the present description are situations in which the IP endpoint 110A is used to place a toll-free call to a toll-free subscriber that may provide endpoints in both region A 104 and region B 106. The toll-free subscriber is an entity that subscribes to a toll-free service, whereby the subscriber has one or more telephone numbers that callers can call free of charge. For example, a toll-free subscriber may provide customer service, technical support, sales, or polling service through a toll-free number. In the United States, toll-free numbers typically have a prefix of the form "1-8XX".

Accordingly, the IP endpoint 110A may place a toll-free (TF) call to a TF subscriber that has TF subscriber endpoint 112A and TF subscriber endpoint 112B, in regions A 104 and region B 106, respectively. TF subscriber endpoints are typically communication devices, such as PSTN telephones, VoIP telephones or otherwise. For various reasons, such as capacity planning or time zone considerations, it may be desirable for toll-free calls placed by a mobile endpoint to be routed to a TF subscriber endpoint in the region assigned to the mobile endpoint, rather than a different region that the mobile endpoint may be in at the time of the call. For example, referring to FIG. 1, it may be desirable to route toll-free calls placed by IP endpoint 110A to the TF subscriber endpoint 112A, regardless of whether the IP endpoint 110A is in region A 104, region B 106, or another region 108. Various embodiments of systems and methods described herein provide for routing outbound toll-free calls through a geographically distributed network, such as the VoIP network 102, to an appropriate toll-free service network in the region assigned to the calling party, regardless of whether the calling party is currently in the assigned region.

In conventional Public Switched Telephone Network (PSTN) systems, a party placing a toll-free call inherently has geographic relevance by virtue of the end office switch that receives the TF call. Considering the environment 100 of FIG. 1, PSTN endpoints 114A and 114A' are static and are directly connected to end office switches in regional carrier networks, such as a Local Exchange Carrier (LEC) network 116A and a Competitive LEC network 118A, respectively. The LEC network 116A and the CLEC network 118A, as well as the endpoints connected to them, are regional in nature; i.e., they are statically associated with region A 104. The LEC 116A or CLEC 118A provide local exchange service to endpoints within region A 104. LEC 116A and CLEC 118A also send long distance and toll-free calls to inter-region carriers or interexchange carriers (IXCs) at IXC networks 120A-120A' in region A 104. The IXCs 120 terminate toll-free calls at the appropriate toll-free subscriber endpoint 112A.

Toll-free calls arriving at an end-office switch 122 in the LEC 116A or CLEC 118A are directed to a tandem switch 124 of the LEC 116A. When the tandem switch 124A receives a toll-free call, the tandem switch 124 determines which IXC 120A-120A' to send the toll-free call to, by querying a toll-free call administration database, such as a service management system (SMS)/800 database 126. The SMS/800 database 126 responds to the query with a carrier identification code (CIC) associated with the appropriate IXC network 120A to handle the toll-free call. In some embodiments, the SMS/800 database 126 may also respond with a sub-CIC. The tandem switch 124 then sends the toll-free call on to the IXC network 120A associated with the CIC. It is possible for more than one IXC to provide toll-free service to a toll-free subscriber 112A. In this regard, the SMS/800 database 126 may include logic to choose among multiple IXCs 120A-120A' based on criteria, such as load balancing (e.g., round-robin, percent allocation, proportional loading).

Similar routing is performed in region B 106 by LEC network 116B and CLEC network 118B. Toll-free calls received by LEC network 116B and CLEC network 118B are directed to appropriate IXC networks 120B-120B' so that the calls are terminated at the appropriate TF subscriber endpoint 112B. Similar processes are carried out in other regions 108. It will be understood that one or more of IXC networks 120A-120A' may be owned and managed by the same IXC as IXC networks in region B 106 or other regions 108.

With regard to toll-free calls placed by the IP endpoint 110A, the VoIP network 102 includes routing functionality to direct the toll-free calls to a network in the appropriate region, region A 104 in this particular example. Depending on various factors, the VoIP network 102 may direct a toll-free call to a tandem switch (e.g., tandem switch 124) in the LEC network 116A, or the CLEC network 118A, or a selected IXC network 120A. Embodiments of systems and methods for outbound routing of toll-free calls placed by mobile endpoints are discussed in further detail below.

Figure 2:
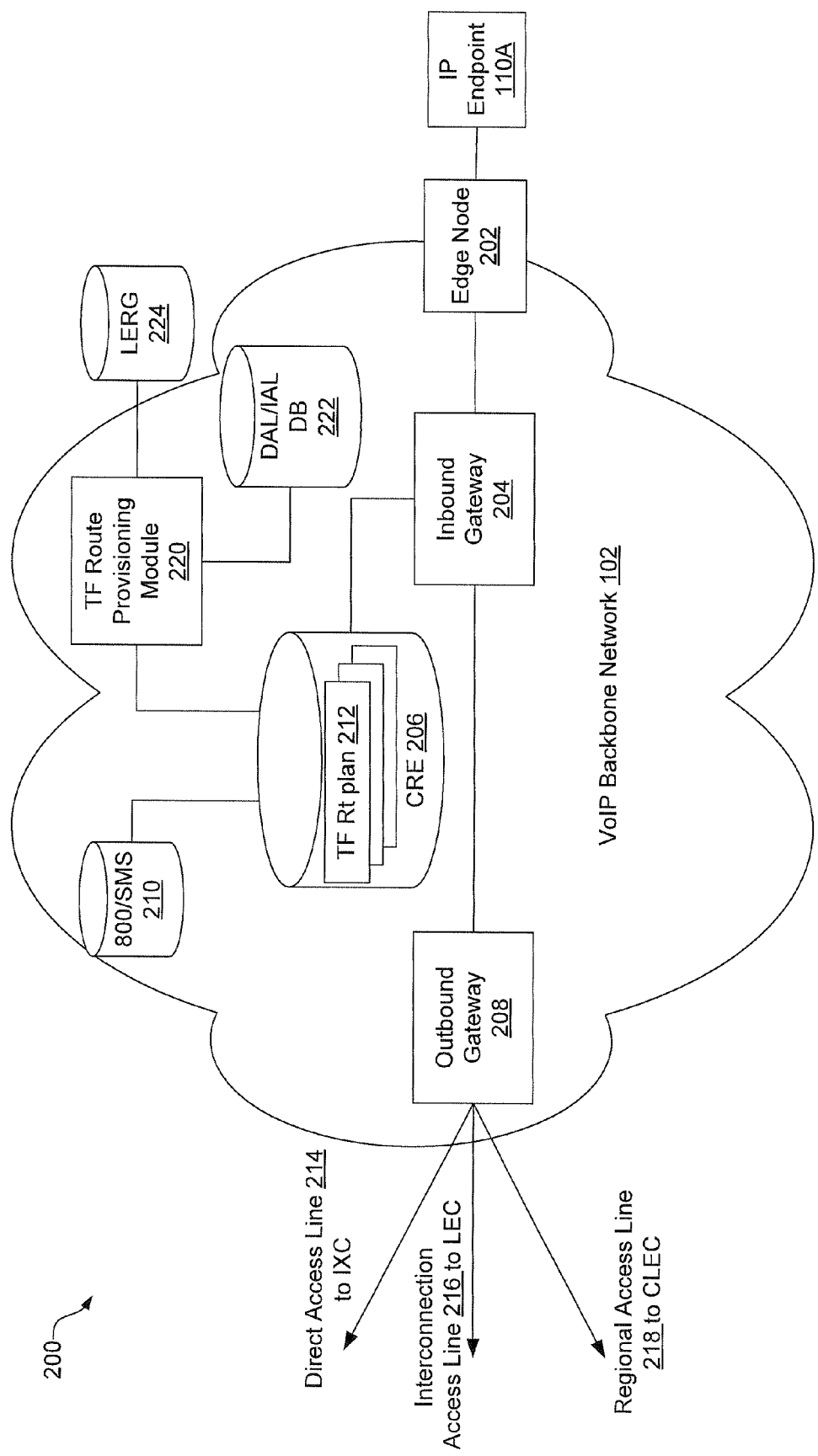
FIG. 2 illustrates an exemplary configuration of network components for outbound routing of toll-free calls in accordance with one embodiment.

FIG. 2 illustrates an exemplary configuration 200 of components in the VoIP backbone network 102 in accordance with one embodiment of a system for routing outbound toll-free calls to a toll-free service provider, or a regional network that can further route the calls to the toll-free service provider. For simplicity, many of components, such as routers, load balance servers, and gatekeepers, which are normally found in a VoIP backbone network are not shown or described here, but those skilled in the art will readily understand those components and their implementation.

In the simplified illustration of FIG. 2, the VoIP network 102 includes an edge node 202, an inbound gateway 204, a core routing engine (CRE) 206, and an outbound gateway 208. A toll-free (TF) call made by the IP endpoint 110A is received at the edge node 202, which routes the TF call to the inbound gateway 204. The inbound gateway 204 sends a routing request to the CRE 206 to determine how to route the TF call out of the VoIP network 102.

One skilled in the art will appreciate that embodiments of the network 102 are not limited to the specific illustration in FIG. 2, and that other embodiments of the network 102 are viable. For instance, edge node 202 and inbound gateway 204 could have a TDM interconnect. Additionally, IP endpoint 110A could be a TDM endpoint with a TDM connection to edge node 202. Edge node 202 could have either an IP or TDM connection to inbound gateway 204. Embodiments of the invention provide a routing solution regardless of the type of endpoint or method used to deliver the call to the network 102.

The CRE receives the called TF number and the calling party number or OEN (i.e., the telephone number assigned to the IP endpoint 110A) in the routing request. The CRE 206 determines that the called number is a toll-free number. For example, the TF call may be of the format "1-8XX-YYY-ZZZZ" (in the United States). The CRE 206 is operable to recognize this format and responsively identify a toll-free route label associated with the calling party number. The route label (also referred to as a routing label) identifies a route plan having one or more routes out of the VoIP network 102 to which the TF call should be routed.

In one embodiment, to determine the route label, the CRE 206 determines the LATA of the IP endpoint 110A telephone number (i.e., the originating endpoint number (OEN)). In some embodiments, the CRE 206 is configured to perform route label determination based on the dialed number under normal circumstances. In these embodiments, when the dialed number is a toll-free number, a step is performed to cause the CRE to determine the route label based on the OEN, rather than the dialed number. Specifically, the OEN is copied into a dialed number (DN) portion of the routing request to the CRE. When the CRE gets the request the CRE assumes the DN is the OEN and performs LATA lookup using the OEN.

The CRE 206 is in operable communication with a toll-free administration system, such as a SMS/800 database 210. However, it should be noted that embodiments of the invention are not necessarily limited to a toll-free administration database. In some embodiments, a different database may be utilized in lieu of the SMS/800 database, such as an ENUM database. Furthermore, one skilled in the art will appreciate that other routing options are available, such as routing by DNS resolution.

In one embodiment, one or more queries are made to a database configured to return outbound routing information, such as a carrier identification code (CIC). As just one example, the CRE 206 can "dip" into the SMS/800 database 210 to determine outbound routing information. The response from the SMS/800 database 210 typically includes one of three responses: (1) a CIC corresponding to the toll-free number; (2) a 10-digit NANP TN; or (3) treatment/release response. Which response is returned is determined by the toll-free TN and the originating TN (LATA, NPA, or NPA-NXX). Embodiments of the invention focus on the routing associated with the SMS/800 database 210 returning a CIC. In this regard, the CRE 206 queries the SMS/800 database 210 with the LATA of the call originator, IP endpoint 110A. The SMS/800 database 210 returns a CIC associated with an IXC that services the toll-free number in the LATA associated with the OEN assigned to the IP endpoint 110A.

The CRE 206 accesses a set of toll-free routing labels and plans 212 that are stored in memory to determine the desired route out of the VoIP network 102. Based on the routing labels 212, the toll-free call may be routed to the appropriate IXC network via a direct access line (DAL) 214, an appropriate LEC via an interconnection access line 216, or an appropriate CLEC via a regional access line 218. Examples of interconnection access lines are a meet point trunks (MPT) or meet point billing trunks (MPBT) that interconnect the VoIP network 102 with a LEC at a tandem switch in the LEC.

In this particular embodiment, a provisioning module 220 provisions the TF routing labels on the CRE 206. Two types of toll-free route labels are provisioned: Carrier Identification Code (CIC)-based route labels and originating endpoint number (OEN)-based route labels. In general, a CIC-based route label identifies a route plan including one or more direct access lines (DALs) associated with a CIC, and an OEN-based route label identifies a route plan including one or more interconnection access lines (e.g., MPTs) associated with a calling party number. The provisioning module 220 performs different processing to determine and provision each type of route label.

According to the illustrated embodiment, the provisioning module 220 generates CIC-based route labels by identifying one or more DALs directly connecting the VoIP network 102 to the IXC network associated with a given CIC. The provisioning module 220 obtains information about available DALs from an access line database, such as DAL/IAL database 222, which can include a list of identifiers for all available DALs and/or other interconnection access lines (IALs). The provisioning module 220 maps a CIC to each DAL identified in the database 222. An exemplary CIC-based route label data format is shown in FIG. 3 and described below.

To provision OEN-based route labels, the provisioning module 220 creates a route label, the contents of which contain interconnection access lines (e.g., MPTs) that qualify to carry toll-free calls for the OEN-based NPA/NXX number. The provisioning module 220 uses data from a local exchange routing guide (LERG) 224 to map NPA/NXX numbers to interconnection access lines. The LERG provides mappings of originating NPA/NXX numbers to originating tandem switches. The provisioning module determines the tandem switch(es) connected to each qualified interconnection access line. For each tandem switch, the NPA/NXX numbers associated with that tandem switch are mapped to the qualified interconnection access lines that connect the VoIP network 102 to that tandem switch. Toll-free route labels are generated and stored on the CRE. An exemplary OEN-based route label format is shown in FIG. 3 and described below.

Figure 3:
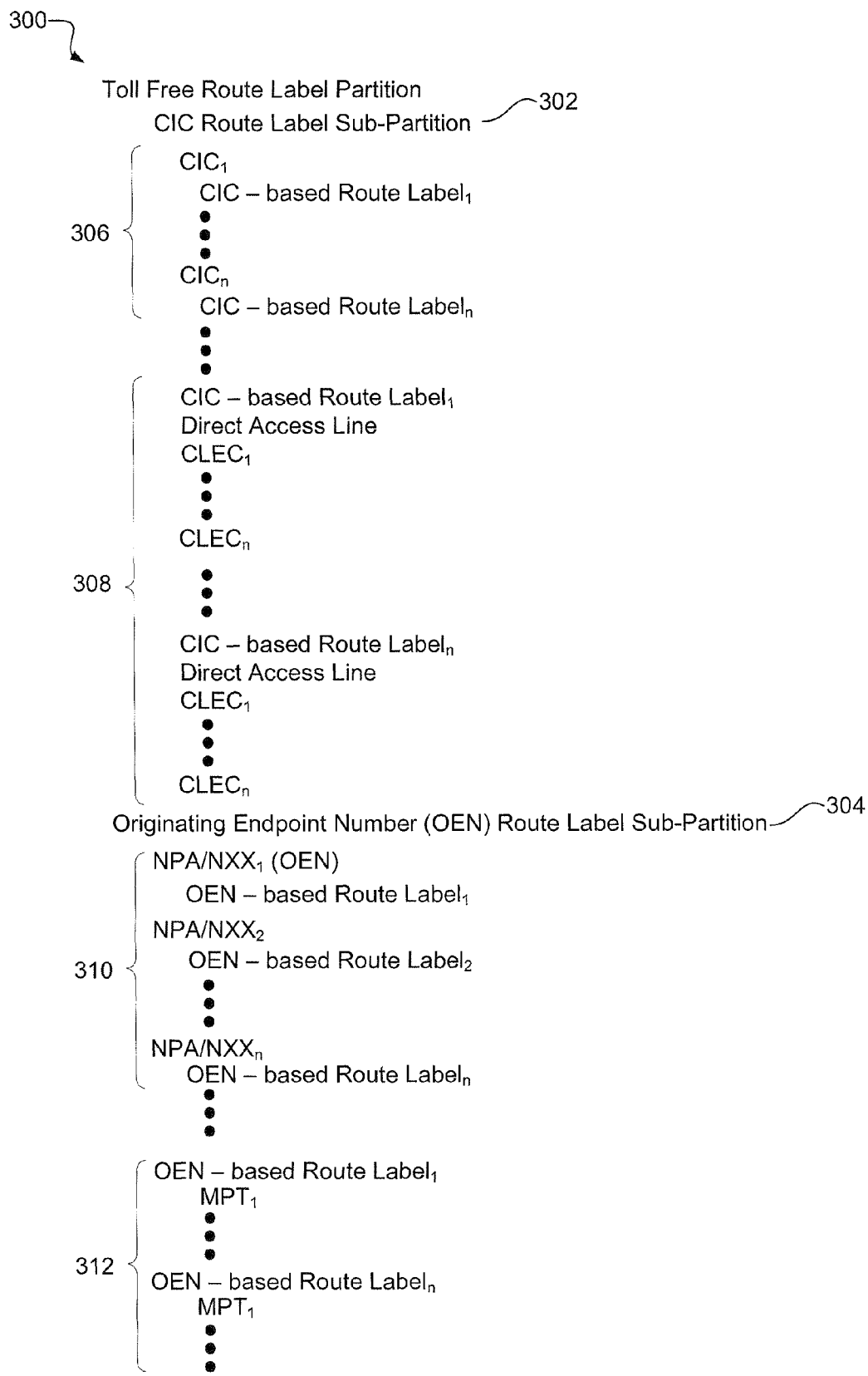
FIG. 3 illustrates a format for toll-free routing labels in a toll-free routing label partition of a routing label database in accordance with one embodiment.

FIG. 3 illustrates a toll-free route label format that may be used in the CRE 206 (FIG. 2) in accordance with one embodiment. In this embodiment, each route label identifies a route plan that includes a prioritized list of routes. The route labels and route plans are provisioned in a toll-free route label partition 300 of a memory in the CRE 206. The CRE includes logic for indexing into the TF route label partition 300.

In this particular embodiment, the TF route label partition 300 includes two sub-partitions: a CIC-based route label sub-partition 302 and an OEN-based route label sub-partition 304. The CIC-based route label sub-partition 302 includes a CICto-route label mapping section 306 that associates CICs with route labels. The CIC-based route label sub-partition 302 also includes a CIC-based route label section 308 that has the CIC-based route labels themselves. When the CRE receives a CIC from the SMS/800, the CRE first searches for the received CIC in the partition 302. When the CIC is found, the CRE searches for the associated CIC-based route label identifier in the route plan section 308 to get the route plan information. If this label is not found, the switch searches for an OEN-based route label in sub-partition 304.

An OEN-to-route label mapping section 310 associates NPA/NXX numbers of OENs with route label identifiers. The CRE is configured to search the OEN-to-route label mapping section 310 for the NPA/NXX portion of an OEN to obtain a corresponding route label identifier. The CRE then searches the OEN-based route plan section 312 for the obtained route label identifier to get the route plan information.

To further illustrate OEN-based route labels and plans, two route plans are shown below:

```
DNVRCOMA02T_OTF_TF_TERM
    DNVRCOMA02T_OTF_DIRECT
    CLEC₁
    ⋮
    CLECₙ
DNVRCOSO02T_OTF_TF_TERM
    DNVRCOSO02T_OTF_DIRECT
    CLEC₁
    ⋮
    CLECₙ
```

In the above exemplary route plans, known Common Language Location Identifier (CLLI) codes are used in the route labels. The name DNVRCOMA02T_OTF_TF_TERM is a route label corresponding to a tandem switch at a main office in Denver, Colo. The name DNVRCO SO02T_ OTF_TF_ TERM is a route label corresponding to a tandem switch at a south office in Denver, Colo. The name DNVRCOMA02T_OTF_DIRECT identifies an MPT that can be used to terminate the associated TF call at the tandem switch DNVRCOMA02T. A list of CLEC (or other off network) identifiers is also provided in a prioritized order. The CLECs can be used to route the TF call, if the MPT is unavailable, overloaded, or otherwise not useable.

Exemplary Operations

Figure 4:
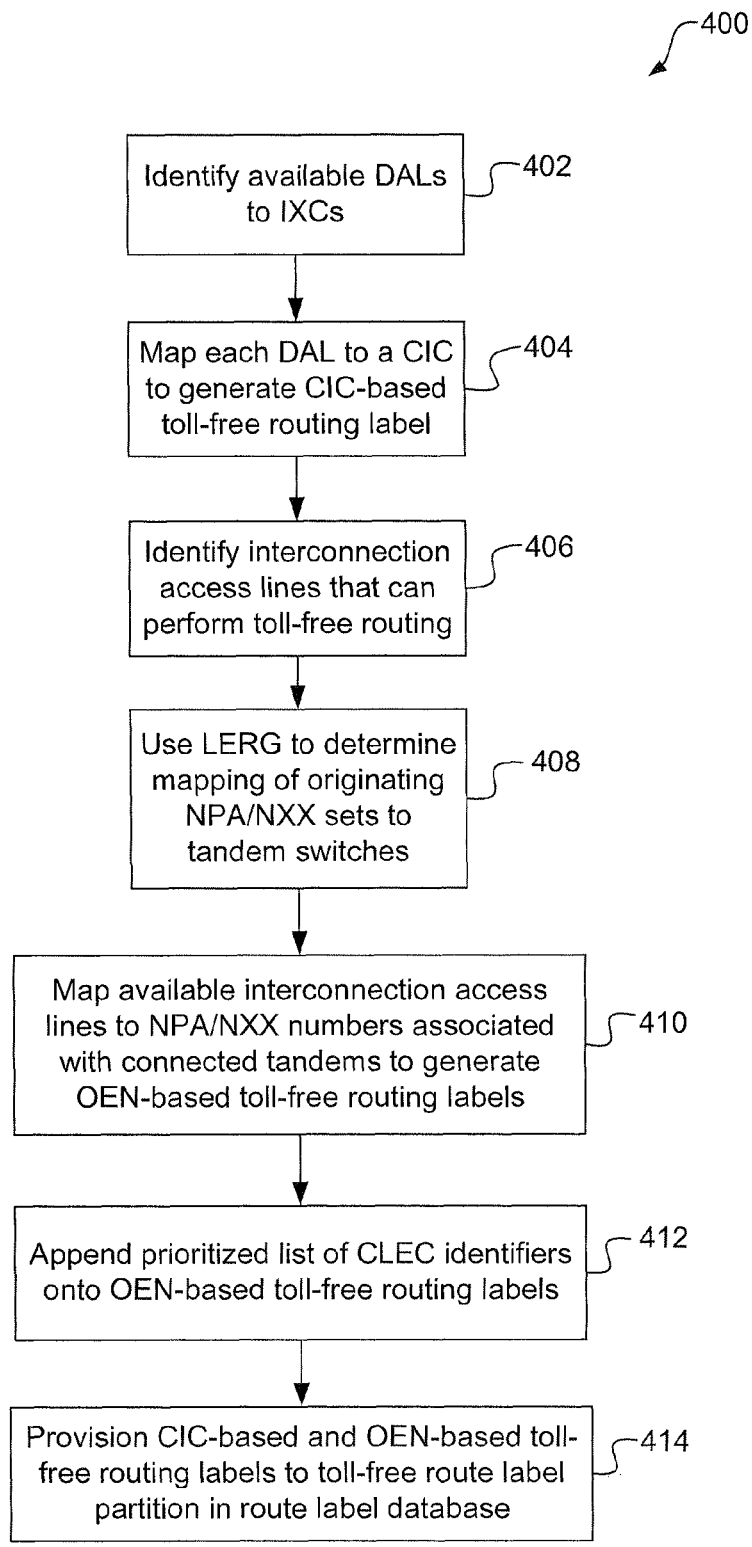
FIG. 4 is a flowchart illustrating a toll-free route label provisioning algorithm in accordance with one embodiment.

FIG. 4 is a flowchart illustrating a toll-free route label provisioning algorithm in accordance with one embodiment. The provisioning algorithm 400 can be carried out by the provisioning module 220 shown in FIG. 2, or another computing device or component. The provisioning algorithm 400 is typically performed periodically or in response to changes to network infrastructure so as to keep the provisioned routes up to date.

An identifying operation 402 identifies available direct access lines (DALs) from the VoIP network to associated IXCs. The available DALs may be identified in a database where information about DALs is stored. A mapping operation 404 maps each DAL to a CIC to generate a set of CIC-based toll-free route labels.

Another identifying operation 406 identifies available interconnection access lines (IALs), such as MPTs, which connect the VoIP network to tandem switches in LECs. The IALs may be identified in a database where information about IALs is stored. A determining operation 408 determines NPA/NXX numbers for the tandem switches connected to the identified IALs. In one embodiment, the determining operation 408 uses a LERG to determine the associated NPA/NXX numbers. A mapping operation 410 maps the available IALs to the NPA/NXX numbers determined in the determining operation 408 to generate a set of OEN-based toll-free route labels.

An appending operation 412 appends one or more CLEC identifiers onto the OEN-based route labels. The CLEC identifiers may be ordered in a prioritized manner based on proximity with the NPA/NXX numbers. A provisioning operation 414 then stores the generated CIC-based route labels and OEN-based route labels in a toll-free route label partition of a route label database.

Figure 5:
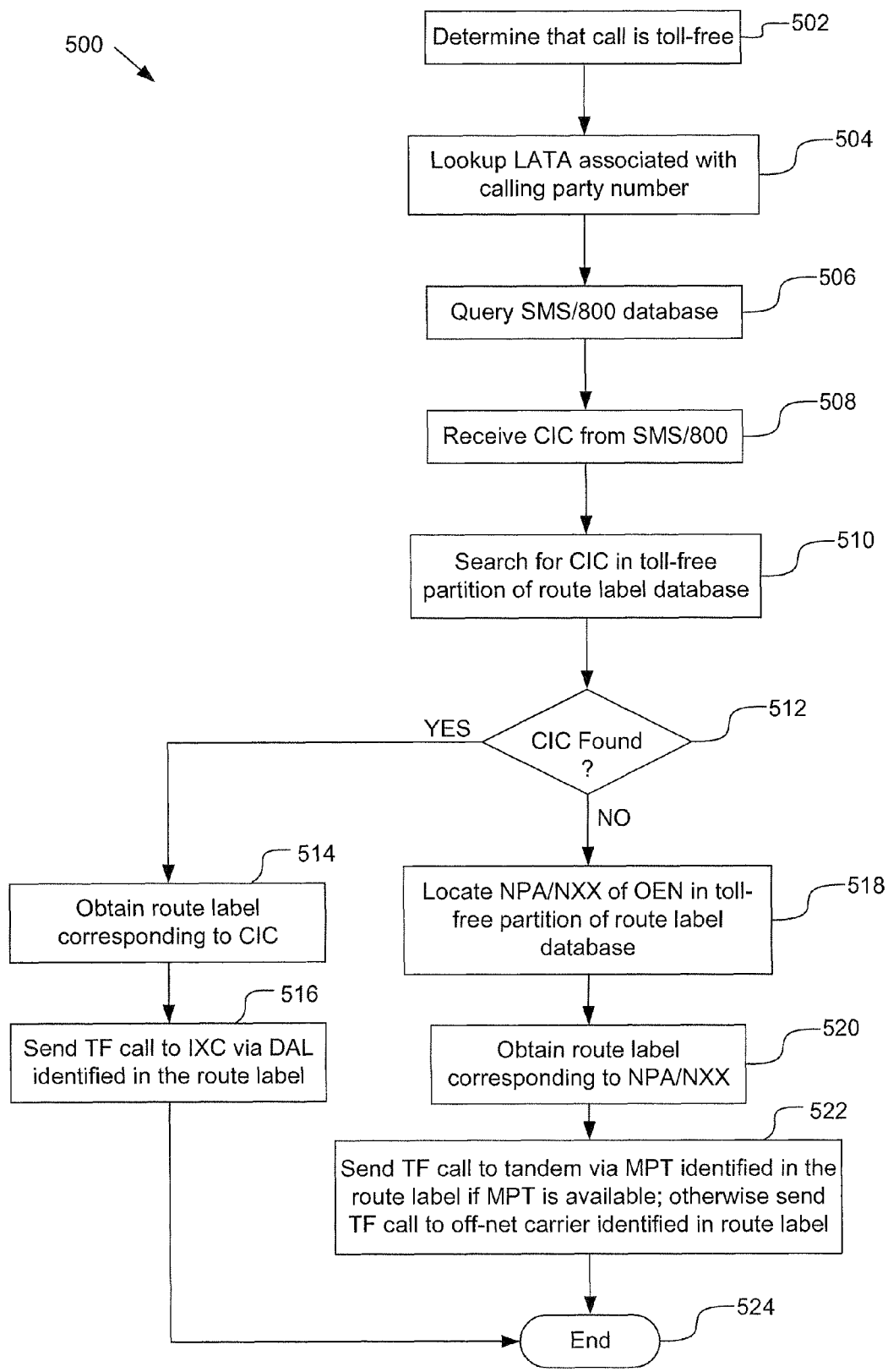
FIG. 5 is a flowchart illustrating an outbound toll-free call routing algorithm using toll-free routing labels such as those provisioned in the provisioning algorithm of FIG. 4.

FIG. 5 is a flowchart illustrating an outbound toll-free call routing algorithm 500 using toll-free routing labels such as those provisioned in the provisioning algorithm of FIG. 4. The algorithm 500 may be carried out by one or more components illustrated in the VoIP network diagram of FIG. 2. The routing algorithm 500 is performed whenever a toll-free call is received in the VoIP network.

A determining operation 502 determines that a received call is a toll-free call. In the United States, the toll-free call is determined if the dialed number is of the form "1-8XX-YYY-ZZZZ". In a lookup operation 504, the LATA corresponding to the originating endpoint number is looked up to determine the local region assigned to the calling party. LATA tables are maintained in the telecommunication industry and are publicly available for performing the lookup operation 504. A querying operation 506 then queries an SMS/800 database using the determined LATA. In a receiving operation 508, a CIC is received from the SMS/800 in response to the querying operation 506. It should be noted that the SMS/800 will not always return a CIC, but the situations where a CIC is returned are most relevant to this description.

In a searching operation 510, a routing label database is searched for the CIC that was received from the SMS/800 database. A querying operation 512 determines whether an entry was found in the route label database corresponding to the CIC. If a CIC entry was found, the algorithm branches "YES" to an obtaining operation 514. The obtaining operation 514 obtains a CIC-based route label from the route label database. The route label includes a DAL. In a sending operation 516, the toll-free call is sent to an IXC via the DAL included in the route label.

If in the querying operation 512 no CIC entry is found in the route label database, the algorithm branches "NO" to a locating operation 518. The locating operation 518 locates an NPA/NXX in the toll-free partition of the database that corresponds to the originating endpoint number (e.g., the calling party number). When the OEN-based route label is located, and obtaining operation 520 reads the route label from the route label database. A sending operation 522 sends the toll-free call to either a tandem switch of a LEC or a CLEC. If the OEN-based route label includes an MPT, the TF call is sent to a tandem switch via the MPT. Otherwise, the TF call is sent to an off network (off-net) carrier identified in the OEN-based route label. The off-net carrier may be a CLEC, IXC or other carrier. After the TF call is routed out of the VoIP network via either sending operation 516 or sending operation 522, the outbound routing operation 500 ends at end operation 524.

The order of operations shown in FIGS. 4 and 5 is not critical. Rather, the operations may be performed in various different orders than those shown. In addition, the operations may be reorganized in numerous different ways without departing from the scope of the invention. For example, in some networks no DALs have been implemented. In such networks the operations involving DALs (e.g., identifying operation 402, mapping operation 404) may or may not be carried out.

Exemplary Computing Device

Figure 6:
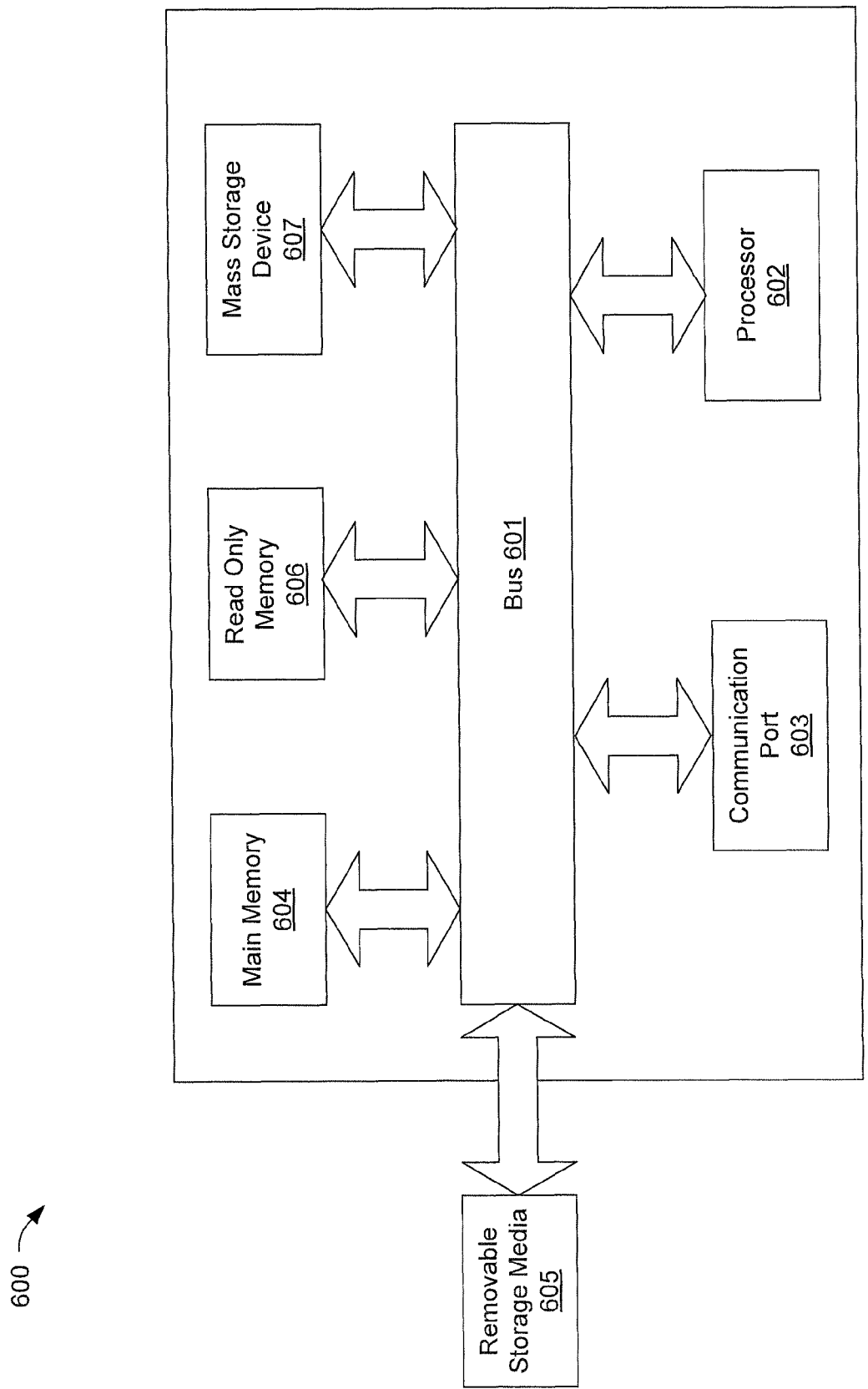
FIG. 6 illustrates a general purpose computing device upon which embodiments of the present invention can execute.

FIG. 6 is a schematic diagram of a computing device 600 upon which embodiments of the present invention may be implemented and carried out. As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 600 includes a bus 601, at least one processor 602, at least one communication port 603, a main memory 604, a removable storage media 605, a read only memory 606, and a mass storage 607. Processor(s) 602 can be any know processor, such as, but not limited to, an Intel® Itanium® or Itanium 2® processor(s), AMD® Opteron® or Athlon MP® processor(s), or Motorola® lines of processors. Communication port(s) 603 can be any of an RS-232 port for use with a modem based dialup connection, a 10/100 Ethernet port, a Gigabit port using copper or fiber, or a USB port. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Based on the disclosure provided herein, one of ordinary skill in the art will appreciate a myriad of behaviors that may be quantified using the presented approach. Further, based on the disclosure provided herein, one of ordinary skill in the art will recognize a variety of ways that the aforementioned information may be used. For example, the aforementioned information may be used in a proactive way to modify the design of a particular transaction network to achieve better performance. Alternatively, the aforementioned information may be used in a reactive way to cure identified failures in a network under test. Again, based on the disclosure provided herein, one of ordinary skill in the art will appreciate a variety of ways that the information may be used.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for routing a toll-free call through a geographically distributed network configured to route calls from call origination endpoints, whereby a call originating from a call origination endpoint may enter the geographically distributed network at any one of a plurality of geographic regions, the method comprising:
   receiving a toll-free call from a call origination endpoint;
   determining an identifier associated with the call origination endpoint, wherein the identifier is statically associated with a specified geographic region;
   if a direct access line (DAL) is not available for providing access to an interexchange carrier (IXC) configured to terminate the toll-free call in the specified geographic region, determining a meet point trunk based on at least a portion of the identifier; and
   routing the toll-free call to a local exchange carrier (LEC) via the determined meet point trunk.

2. The method as recited in claim 1, further comprising determining whether a DAL is available, wherein determining whether a DAL is available comprises:
   querying an SMS/800 database; receiving a carrier identification code (CIC) from the SMS/800 database in response to the querying operation; and
   searching for an available direct access line (DAL) based on the received CIC.

3. The method as recited in claim 1, wherein the geographically distributed network comprises a managed backbone Voice over Internet Protocol (VoIP) network.

4. The method as recited in claim 1, wherein the identifier comprises a telephone number in the form NPA-NXX-YYYY.

5. The method as recited in claim 4, wherein determining a meet point trunk comprises looking up a route plan mapped to a range of NPA/NXX numbers in a route plan database.

6. The method as recited in claim 5, further comprising provisioning a plurality of CIC-based route plans and a plurality of originating endpoint number (OEN)-based route plans.

7. The method as recited in claim 6, further comprising mapping each of a plurality of meet point trunks to the range of NPA/NXX numbers.

8. The method as recited in claim 6, further comprising mapping each of a plurality of DALs to an associated CIC.

9. A non-transitory computer-readable medium having computer-executable instructions causing a computer to perform a process of routing toll-free calls through a geographically distributed network spanning a plurality of regions, and configured to handle toll-free calls from call origination endpoints, wherein the process comprises:
   in the geographically distributed network, receiving a toll-free call from a call origination endpoint;
   determining one or more interconnection access lines providing access to a regional access carrier, wherein the interconnection access lines are associated with the call origination endpoint's assigned number;
   selecting a first one of the plurality of interconnection access lines for routing the toll-free call to the regional access carrier; and
   routing the toll-free call to the regional access carrier via the first selected interconnection access line.

10. The computer-readable medium as recited in claim 9, wherein the process further comprises determining whether a direct access line exists that provides access from the geographically distributed network to an interexchange carrier configured to handle the toll-free call.

11. The computer-readable medium as recited in claim 10, wherein determining whether a direct access line exists comprises:
   querying a carrier identification code (CIC) database configured to supply a CIC associated with a region associated with the origination endpoint's assigned number;
   responsively receiving a CIC from the CIC database; and
   searching an access line database for a direct access line associated with the received CIC.

12. The computer-readable medium as recited in claim 9, wherein the process further comprises mapping a plurality of NPA/NXX numbers to an available interconnection access line.

13. The computer-readable medium as recited in claim 12, wherein mapping the plurality of NPA/NXX numbers comprises identifying a tandem switch connected to the interconnection access line.

14. The computer-readable medium of claim 11, wherein the CIC database is at least one of a toll-free call administration database and an ENUM database.

15. A system for routing a toll-free call entering a network to an appropriate carrier, the system comprising:
   an inbound gateway device configured to receive a toll-free call from a call origination endpoint having an assigned telephone number and query a core routing engine for a route plan using the assigned telephone number; and
   a core routing engine (CRE) configured to select an interconnection access line based on the origination endpoint telephone number, wherein the interconnection access line is connected to a local exchange carrier (LEC) that is operable to route the call to the appropriate carrier.

16. The system as recited in claim 15, further comprising a provisioning module configured to identify one or more meet point trunks in the network and map a range of NPA/NXX numbers to each of the one or more meet point trunks.

17. The system as recited in claim 15, wherein the CRE is further configured to look up a Local Access and Transport Area (LATA) associated with the origination endpoint and query a toll-free administration database using the LATA to determine a carrier identification code (CIC) associated with an appropriate interexchange carrier (IXC).

18. The system as recited in claim 15, further comprising a route plan database having a toll-free route partition, wherein the provisioning module is further configured to store a plurality of route plans associated with toll-free calls.

19. The system as recited in claim 18, wherein at least one of the plurality of route plans identifies a meet point trunk and an off-network carrier.

20. The system as recited in claim 15, further comprising an outbound gateway device configured to route the toll-free call via the selected interconnection access line.

* * * * *